United States Patent [19]
Kiest, Jr.

[11] Patent Number: 5,501,248
[45] Date of Patent: Mar. 26, 1996

[54] EXPANDABLE PIPE LINER AND METHOD OF INSTALLING SAME

[75] Inventor: Larry W. Kiest, Jr., Ottawa, Ill.

[73] Assignee: LMK Enterprises, Inc., Ottawa, Ill.

[21] Appl. No.: 264,503

[22] Filed: Jun. 23, 1994

[51] Int. Cl.⁶ .................................................. F16L 55/162
[52] U.S. Cl. ........................... 138/98; 138/123; 264/36; 156/287
[58] Field of Search ......................... 138/97, 98, 123, 138/124; 156/287, 294; 264/36, 267, 269, 516; 425/11; 428/34.6, 35.2, 36.1, 230, 245, 253, 290

[56] References Cited

U.S. PATENT DOCUMENTS

| | | |
|---|---|---|
| 2,794,758 | 6/1957 | Harper et al. . |
| 3,230,129 | 1/1966 | Kelly . |
| 3,494,813 | 2/1970 | Lawrence et al. . |
| 3,560,295 | 2/1971 | Kimbrell et al. . |
| 3,976,578 | 8/1976 | Beane . |
| 4,064,211 | 12/1977 | Wood . |
| 4,180,464 | 12/1979 | Beane . |
| 4,284,507 | 8/1981 | Beane . |
| 4,288,321 | 9/1981 | Beane . |
| 4,322,232 | 3/1982 | Beane . |
| 4,427,480 | 1/1984 | Kamuro et al. . |
| 4,576,205 | 3/1986 | Morinaga et al. . |
| 4,600,615 | 7/1986 | Hyodo et al. . |
| 4,681,783 | 7/1987 | Hyodo et al. . |
| 4,686,126 | 8/1987 | Hyodo et al. . |
| 4,723,579 | 2/1988 | Hyodo et al. . |
| 4,724,178 | 2/1988 | Hyodo et al. . |
| 4,778,553 | 10/1988 | Wood ........................................ 138/98 |
| 4,867,921 | 9/1989 | Stekette, Jr. . |
| 4,871,413 | 10/1989 | Hyodo et al. . |
| 4,877,665 | 10/1989 | Higuchi et al. . |
| 4,954,016 | 9/1990 | Storgard . |
| 4,972,880 | 11/1990 | Strand ........................................ 138/98 |
| 4,976,290 | 12/1990 | Gelin et al. ................................ 138/98 |
| 4,985,196 | 1/1991 | LeDoux et al. . |
| 5,010,440 | 4/1991 | Endo ........................................... 138/98 |
| 5,077,107 | 12/1991 | Kaneda et al. ............................. 138/98 |
| 5,186,987 | 2/1993 | Imoto et al. . |
| 5,334,429 | 8/1994 | Imoto et al. ................................ 138/98 |

FOREIGN PATENT DOCUMENTS

| | | |
|---|---|---|
| 1194264 | 10/1985 | Canada . |
| 5534969 | 3/1980 | Japan . |
| 5549225 | 4/1980 | Japan . |
| 1340068 | 12/1973 | United Kingdom . |
| 1580438 | 6/1977 | United Kingdom . |
| 1553408 | 9/1979 | United Kingdom . |
| 2018384 | 10/1979 | United Kingdom . |
| 2042673 | 9/1980 | United Kingdom . |

OTHER PUBLICATIONS

NuPipe Advertisement "NuPipe" from Civil Engineering Magazine, Inc. 1993 decides the use of a beatable plastic pipe linder which is described.

Primary Examiner—David Scherbel
Assistant Examiner—James F. Hook
Attorney, Agent, or Firm—Lockwood, Alex, Fitzgibbon & Cummings

[57] ABSTRACT

A liner for lining the interior of subterranean pipes, such as sewers is formed from a seamless, knitted fabric sleeve having a pile construction in which piles extend away from a ground portion of the sleeve, open areas being formed among the ground and piles. A synthetic resin is applied to the fabric sleeve so as to thoroughly impregnate the sleeve. The resin-coated sleeve may be installed in an underground pipe by everting same under fluid pressure. The sleeve has expansion capabilities which permits the resin-impregnated sleeve to be in contact with the interior surface of the pipe for the entire length of the sleeve.

26 Claims, 4 Drawing Sheets

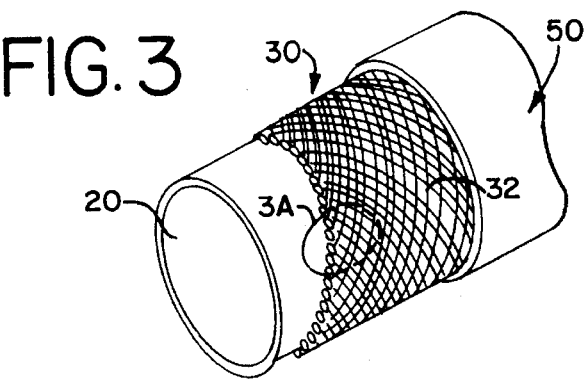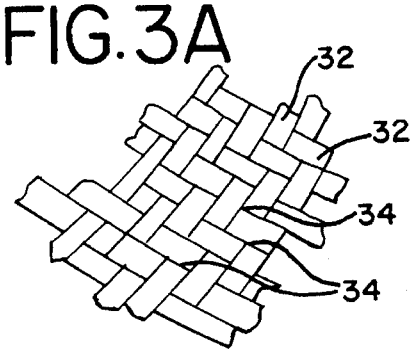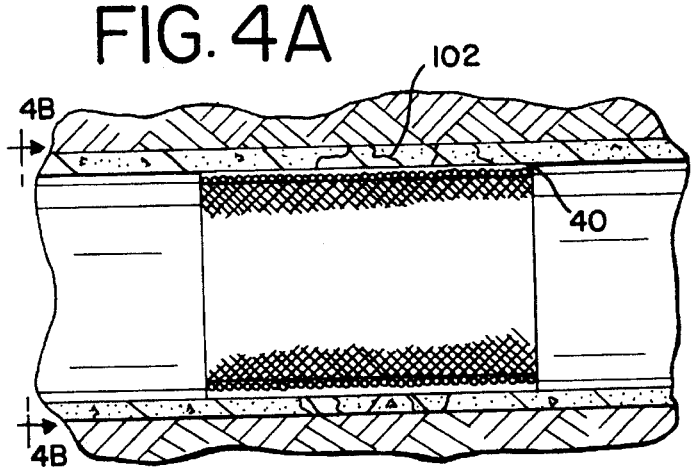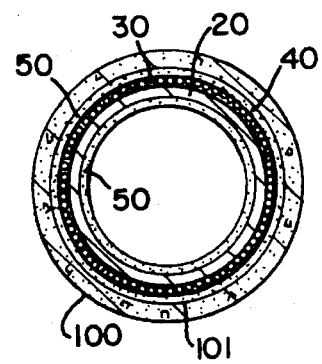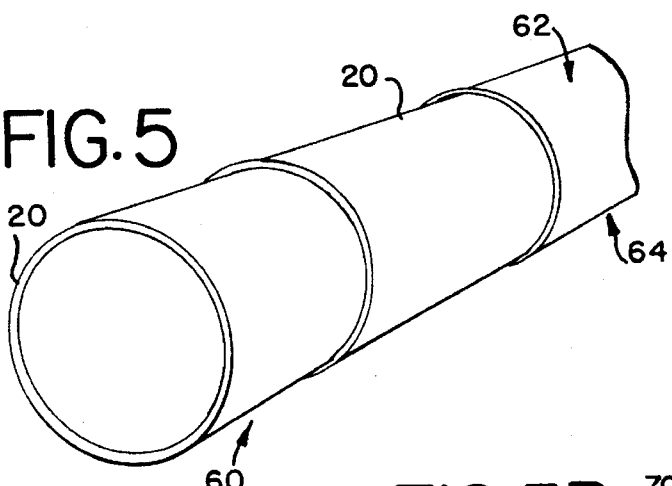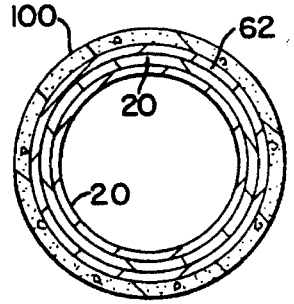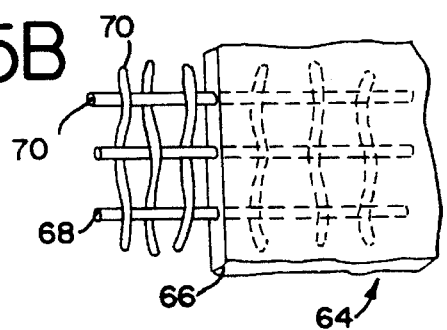

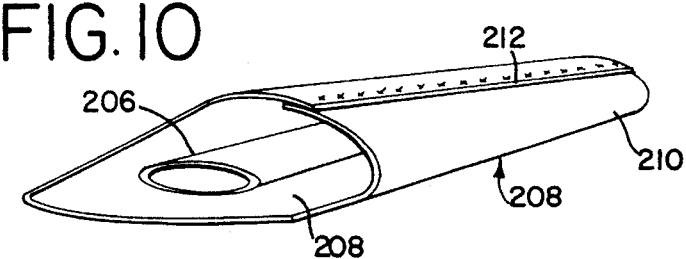
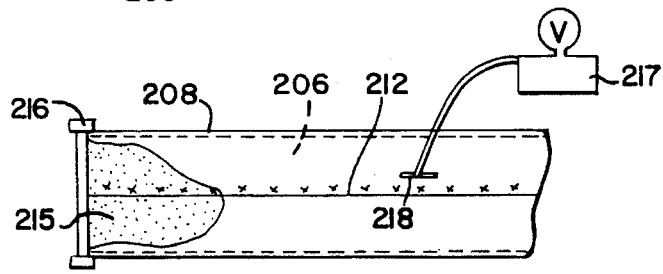
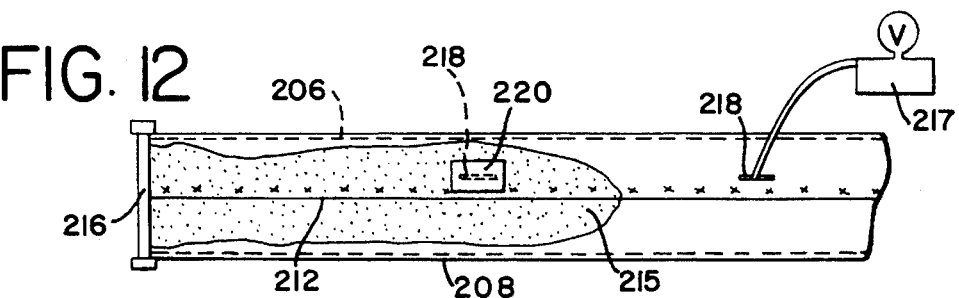
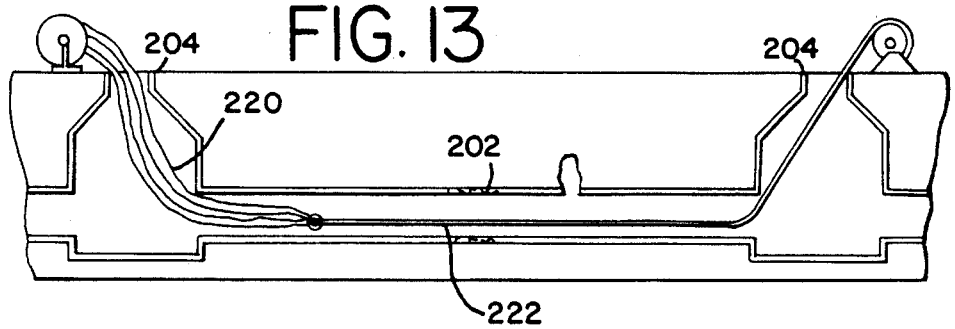
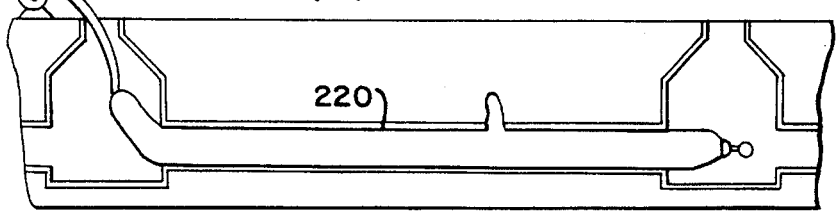
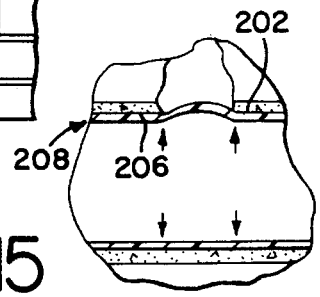

EXPANDABLE PIPE LINER AND METHOD OF INSTALLING SAME

BACKGROUND OF THE INVENTION

The present invention relates generally to a tubular lining material for underground pipelines and the like, and more specifically, relates to a method for relining an underground pipe in situ which utilizes a seamless, expandable fabric liner which expands radially along its length throughout the underground pipe to form a new lining within the existing pipe.

The present invention finds its greatest utility in the area of underground pipeline repair and reconstruction. The most common underground pipeline is a sewer which conveys wastewater from residences and businesses to various collection points of a wastewater collection system and eventually lead to the wastewater treatment facility. Typically, sewers are buried underground and are typically located between streets and roadways. Due to shifting of the earth and secondary surface loadings, portions of the sewer system may become cracked or broken over time. These broken pipe sections compromise the ability and effectiveness of the sewer to accomplish its attended function, namely, the reliable conveyance of wastewater to a collection and treatment facility. Therefore, the prevention of obstructions in sewer pipeline systems is important.

Sewers may have their effectiveness compromised in other ways. For example, the inner surfaces of the sewer pipes may become eroded or at least roughened from continuous contact with wastewater and particularly, abrasive particles suspended therein which contact the interior surfaces of the sewer pipes. This erosion roughens the interior surface of the sewer pipe and consequently increases its pipe roughness coefficient, which is a measure of a pipe's resistance to fluid flow. The larger the roughness coefficient, the greater the head loss experienced by fluid flowing through the pipe. Thus, eroded pipes make it more difficult to convey wastewater than the pipes as originally installed. In order to reclaim the original design parameters of the sewer system, sewer pipes often need to be replaced or relined.

The above problems may be cured by either replacement or repair of the compromised sewer pipe portion. One means of sewer repair known in the art is to excavate the earth and roadway surrounding the broken portions and to replace the broken portions in their entirety. As one might expect, this solution is very expensive and labor-intensive and further leads to a disruption of the roadways and serious traffic problems. An inconvenience to the residence living in the area and utilizing those roadways. It therefore becomes desirable to effect repairs of sewer pipes in situ, i.e., within the underground pipe without excavation of the area surrounding the sewer.

Many method are known for the in situ relining of sewer pipes. Many of these methods utilize resin-coated liners which are inserted into the existing sewer pipe and unrolled against the sewer pipe. Once unrolled, the liner is held against the existing pipe while the resin is permitted to cure. After the resin cures, a new pipe is formed within the existing pipe add provides a new and relatively smooth interior surface having a low roughness coefficient which rivals or betters that of the original sewer pipe when first installed, protects the existing pipe from attack by chemicals found in wastewater effluent and reinforces the existing pipe to withstand external loading. Many of these in situ relining methods are described in the patent literature.

For example, British Patent Specification No. 1,340,068, published Dec. 5, 1973 describes one method of relining a sewer pipe which uses a liner made of a heavy needled felt stitched together along a seam to form an elongated tube which is then coated with a thermosetting resin. The resin-coated tube is wrapped around in an inflatable tubular bladder to form a liner-bladder assembly which is then inserted into a sewer. Hot water is pumped into the bladder to unroll the felt liner into the comprised portion of the sewer pipe. The bladder inflates under the water pressure and urges the felt against the inner surface of the sewer pipe. This particular type of process is not without disadvantages.

The seam is an inherent weak spot which may promote leakage of the resin, not only leading to waste of resin, but also inducing leaking in the cured-in-place pipe formed near the seam. Through the seam, leaking resin may contact and contaminate the hot water used to expand the inflatable bladder, which poses an environmental problem in that the water typically used in such a process for curing the resin is typically released into the environment when the bladder is deflated. In order to reinforce this seam, the British Patent Specification instructs one to overlap the edges of the felt liner along the seam. This overlapping increases the thickness of the liner extending the length of the seam, thereby resulting in an irregular cross-section of the relining sewer, which may adversely effect the flow characteristic of the reline pipe in a manner not expected by the designers or the installers. Additionally, because this heavy felt is not expandable, if the existing pipe has eroded to some extent, the diameter of the felt liner may not match the inner diameter of the existing pipe, and consequently where the felt liner does not contact the pipe wall, an annulus may be created which may become a weak point in the overall pipeline.

Another relining method known in the art is utilizes a plastic liner known as the NuPipe® liner, which is described in U.S. Pat. No. 4,867,921, issued Sep. 19, 1989. This liner is an extruded thermoplastic sleeve formed from polyvinyl chloride (PVC). The PVC liner is heated so that it softens and collapses, whereupon it is pulled through the sewer pipe. A rounding device is then propelled through the plastic liner to force the liner radially outwardly against the existing pipe. This process is not only costly, but also the PVC liner does not expand to any significant degree and accordingly, the installer needs to have a variety of different diameter liners on hand as inventory to effectively match the inner diameter of the existing pipe.

Yet another method of relining an existing sewer pipe includes the use of a woven textile liner which is laminated with multiple resin coatings. This type of liner construction and the method of installation of such a liner is described in numerous patents owned by Ashimori Industry Co., Limited of Japan. One such patent is U.S. Pat. No. 4,600,615, which issued Jul. 15, 1986 and which discloses an underground pipe relining material which consists of a woven air-impervious textile jacket. This textile jacket receives an outer resin coating consisting of multiple polyester resin layers laminated to each other. This construction is similar to that of a conventional fire hose. The production of this laminated outer coating is costly and complex, and it has been recognized in the pipe relining industry that such woven liners, like the fire hoses they emulate, do not expand significantly against the existing sewer pipe walls.

The tubular textile jacket disclosed in this and other Ashimori patents is a woven jacket which is woven on a loom and which utilizes circumferential fiber strands, known as warps, which enclose longitudinal fiber strands known as wefts. The warps substantially decrease the ability of the textile jacket to expand radially against the interior surface of the existing sewer pipe wall during the installation, because of this woven construction and because the liner fabric is intended to be impervious to air. This is a disadvantage because it requires an installation contractor to maintain large amounts of inventory of liners on hand which have different sizes of liners. This lack of expansion is a disadvantage when a compromised sewer pipe section which must be repaired has different diameter pipe sections. The existing pipe may have one diameter as indicated on engineering or installation drawings, while the actual diameter may in fact be lesser or greater at various points along the length of the pipeline. Additionally, the outer laminated resin coating restricts the flexibility of the liner.

Another disadvantage resides in the fact that because the radial expansion of these liners is so severely limited, in instances wherein the liner does not expand completely against the interior surface of the compromised sewer pipe, "tracking" occurs. Tracking is the movement of ground water which enters the space between the liner and the pipe from the surrounding earth and travels between the liner and the sewer pipe.

Another liner construction is disclosed in U.S. Pat. No. 4,723,579, which issued Feb. 9, 1988 and is also assigned to Ashimori Industry Co., Ltd. This patent discloses a complex, multi-layer liner construction which consists of two fabric layers, the first of which is an air-impervious first woven tube having a film of synthetic resin on its exterior surface and the second of which is a seamed, heavy felt that is coated with a binder and placed inside of the first woven tube. The second fabric tube has a series of open holes formed therein to assist in the impregnating of the outer woven tube with the resin binder.

Non-stretchable yarns are disclosed in this patent as comprising the first tube, which again exemplifies the non-expandable nature of woven fabric liners disclosed in Ashimori patents. With the woven fabric's inability to expand, the likelihood of tracking is increased and the installer must maintain a large inventory of woven tubes on hand.

Yet still another disadvantage to the resin cured in situ relining systems described above lies in the problem of resin migration, which is occurs when the resin applied to the liner may be partially dragged off of the liner when the liner assembly is drawn through the pipe or when the liner is inflated against a service connection and resin from the liner accumulates in the service connection. When the resin eventually cures, the liner is then consequently cut in the area of the service connection, but the resin may have migrated past the liner into the service connection and hardened to plug the service connection. Additionally where the liner is permeable, the resin may, during the time it is curing, emit unpleasant odors which may travel up service connections to customer households.

The present invention is therefore directed to an improved method of relining existing underground pipes which overcomes the aforementioned disadvantages.

In one principal aspect of the present invention, an improved method is disclosed for the relining of existing underground pipes which includes providing a liner in the form of a seamless fabric sleeve which is circularly and continuously knitted to define ground stitches and terry loop pile stitches extend from the ground stitches, the knitted construction of the sleeve providing it with radial expansion capabilities of upward to approximately one-third of its original diameter. The knitted liner has a diameter generally less than that of the existing pipeline and is saturated with a liquid resin and subsequently applied to an inflation member to form a relining assembly, which is inserted into the compromised section of the existing sewer pipe. The liner is installed in the existing sewer pipe by everting it so that the resin-impregnated liner opposes the interior surface of the sewer pipe. The resin-impregnated liner is then expanded in place to contact the existing pipe and conforms to the contour of the existing pipe without wrinkles forming in the liner which could affect the finished interior surface of the pipe lining. The resin is subsequently cured in place to form a new lining for the existing pipe section.

In another principal aspect of the present invention, a novel pipe liner is disclosed which comprises a circularly knitted seamless sleeve having defined ground stitches and multiple terry loop pile stitches extending out from the ground for a preselected length, the ground stitches forming a relatively smooth surface of the liner and the pile stitches forming a relatively rough surface of the liner. This pattern of stitching forms open areas between the stitches and imparts the fabric liner with a capability to expand upwards of at least one-third of its original diameter. The liner is saturated with a curable resin, such as a thermosetting polyester, epoxy or vinylester resin, and the open areas formed by the knit stitches permit the resin to thoroughly impregnate the entire fabric liner. The expansion capability of this liner and the fact that the resin is applied to the liner by impregnating, rather than a separate coating or layer, permits the liner to be everted through a pipeline without wrinkles forming in the liner during expansion and curing of the resin.

Yet still another principal aspect of the present invention, the fabric liner sleeve also includes an exterior flexible envelope along its length which provides a barrier between the interior pipe surface and the fabric liner sleeve during installation and subsequent curing to prevent the loss of resin during installation of the liner sleeve and to prevent resin build-up in service connections. This envelope comprises a urethane scrim which envelopes the fabric sleeve. The urethane scrim envelope may be used during the resin application step of the methods of the invention to form an enclosure to which a vacuum may be applied to accelerate the impregnation of the fabric liner sleeve by the resin.

In yet another principal aspect of the present invention, the liner has a composite multiple sleeve construction in which a first knitted fabric sleeve as described above has a second seamless fabric sleeve braided over the first fabric sleeve. The braided fabric sleeve provides reinforcement to the first knitted fabric sleeve and is capable of stretching in both the longitudinal and radial directions to match the expansion characteristics of the first knitted fabric sleeve.

In still another principal aspect of the present invention, a built-up liner is provided having multiple inner seamless knitted sleeves forming an interior portion of the liner in contact with a second seamless fabric braided fabric sleeve which forms an outer portion of the liner and which has a relatively rough surface profile. This multiple layer construction provides for a reinforced liner. The multiple sleeves all share similar expansion characteristics such that they expand together in unison to prevent the formation of wrinkles on the interior finished surface of the liner.

Accordingly, it is an object of the present invention, to provide a novel method for the relining of underground sewer pipes in which a seamless, knitted pile liner is impregnated with a resin and is expanded against the interior surface of the existing sewer pipe.

Another object of the present invention is to provide a liner for use in situ relining of underground pipes in which the liner includes a knitted fabric seamless inner tubular portion, the knit having a ground and a plurality of terry loop piles defined therein in which the piles extend outwardly from the ground, the liner further including a braided fabric seamless outer tubular portion, the interconnected braids preferably extending longitudinally along the liner, the liner further being saturated in a liquid resin which solidifies upon curing, the liner inner and outer portions being radially outwardly expandable when pressure is applied to the interior of the liner.

Another object of the present invention is to provide a method for the in situ relining of underground pipes comprising the steps of selecting a seamless fabric knitted liner, impregnating the fabric liner with a curable resin, inserting the resin-liner assembly into the underground pipe by everting the resin-liner assembly through the existing pipe, such that the liner turns inside out as it travels through the pipe to contact the interior surface of the pipe, expanding the resin-liner assembly against the interior surface of the underground pipe, and permitting the resin to cure in place while the liner is expanded to form a new pipe lining adjacent to and within the existing underground pipe, wherein the fabric liner is continuously knitted in a fashion having stitches that define a ground and stitches having a plurality of piles extending from the ground for a preselected height, the knitted liner being radially expandable from its original diameter whereby, when expanded, the liner conforms to the interior contour of the existing underground pipe.

It is still yet a further object of the present invention to provide a method for relining underground pipes as immediately described above and including the additional steps of enveloping the fabric liner in a urethane scrim envelope and placing the envelope between the pipe wall and the resin-liner assembly so as to provide a barrier between the pipe wall and the fabric liner which prevents the migration of resin during installation of the fabric sleeve and prevents resin build-up in service connections.

It is still another object of the present invention is to provide a reconstructed underground pipe having an original pipe member defining an interior pipe surface, a resin-impregnated liner disposed inside of and adjacent to the interior pipe adjacent to the original pipe interior pipe surface, the resin-impregnated liner including an expandable fabric liner in the form of a knitted, seamless tubular formed from a circularly knitted, crimped yarn knit into stitches defining a ground and stitches defining terry loop pile extending from the ground, the textile sleeve serving as a support for the resin.

Yet still another object of the present invention is to provide a liner for a pipeline having a separate outer, flexible, reinforced membrane which provides a vapor barrier and a resin shield for the liner during the installation and curing process of the liner and which further provides an envelope for use in impregnating the liner with a curable resin.

These and other objects, features and advantages of the present invention will be apparent for the following detail description, taken in conjunction with the accompanying drawings where in like reference numerals refer to like parts.

BRIEF DESCRIPTION OF THE DRAWINGS

In the course of this description, reference would be made to the attached drawings in which:

FIG. 3 is a perspective view of a second pipe liner constructed in accordance with the principles of the present invention;

FIG. 3A is an enlarged view of a portion of the liner of FIG. 3 showing the braided structure thereof;

FIG. 4A is a sectional view of a pipe liner having a composite construction utilizing both of the pipe liners of FIGS. 1 and 3 in place within an underground pipeline;

FIG. 4B is a cross-sectional view of FIG. 4A.

FIG. 5 is a perspective view of another pipe liner constructed in accordance with the principles of the present invention;

FIG. 5A is a cross-sectional view of the liner of FIG. 5 in place within an underground pipe;

FIG. 5B is an enlarged view of an outer scrim assembly used to envelope the pipe liner of FIGS. 5 and 5A;

FIG. 10 is a view illustrating how the resin shield is formed about a fabric liner sleeve;

FIG. 11 is a view illustrating how resin is applied to the fabric liner sleeve when a resin shield is used during installation;

FIG. 12 is a view illustrating how resin is applied to a subsequent section of the fabric liner sleeve of FIG. 11;

FIG. 13 is a diagrammatic view illustrating the installation of an enveloped liner assembly being inserted into a pipeline in an end to end repair format;

FIG. 14 is a view illustrating the inflation of the enveloped liner assembly of FIG. 13; and, FIG. 15 is an enlarged portion of FIG. 14 illustrating a service connection.

DETAILED DESCRIPTION OF THE PREFERRED EMBODIMENTS

Figure 1:
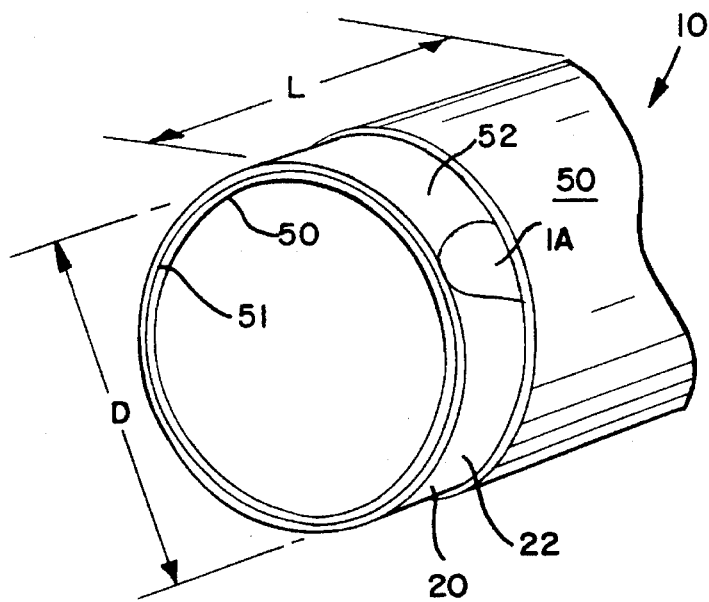
FIG. 1 is a perspective view a pipe liner constructed in accordance with the principles of the present invention.
Figure 1A:
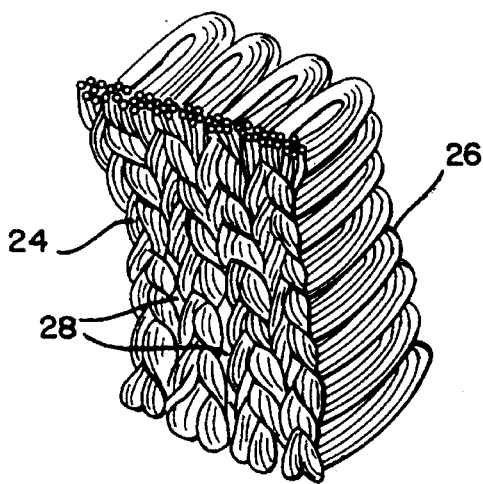
FIG. 1A is an enlarged portion of the liner of FIG. 1 showing the construction of a knitted fabric seamless tube.
Figure 1B:
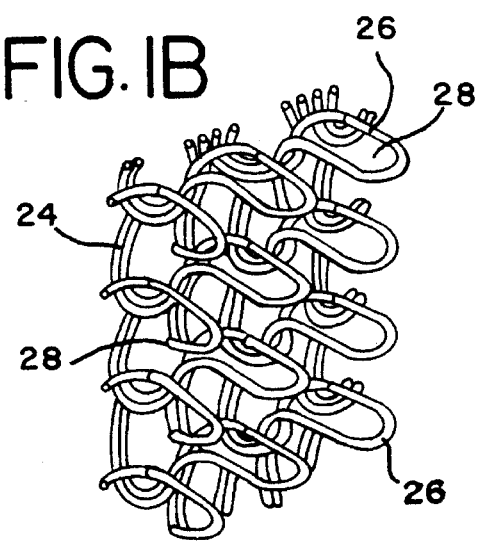
FIG. 1B is a diagrammatic view showing how the ground and loop pile stitches interconnect.
Figure 2:
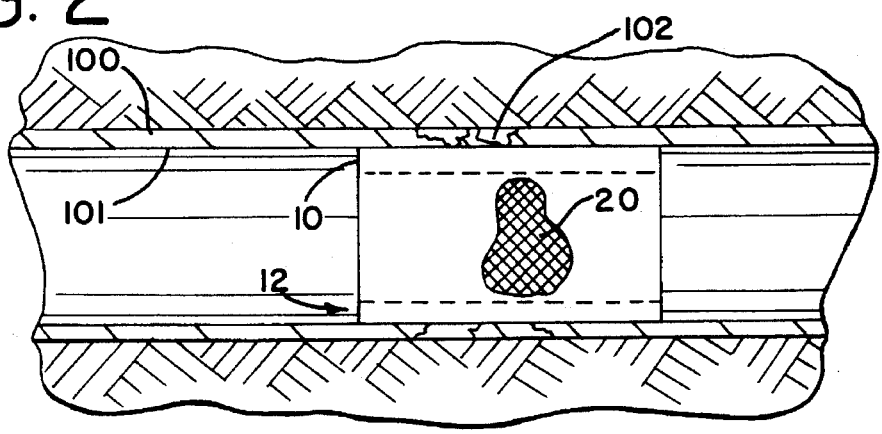
FIG. 2 is a sectional view of a existing underground pipe having a compromised section therein with a pipe liner of FIG. 1 in place and with a portion of the liner cutaway to show the relationship of the components of the liner.
Figure 6:
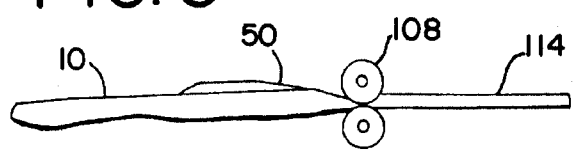
FIG. 6 is a schematic view illustrating how the pipe liner is impregnated with a resin.

FIG. 1 illustrates an expandable pipe liner 10 constructed in accordance with the principles of the present invention. As mentioned previously, the liner 10 is suitable for use in the relining of pipes, such as the underground sewer pipe 100 shown in FIG. 2. The benefits and advantages of the present invention will be hereinafter explained by reference to application in underground sewer pipes, It will be understood, however, that the present invention is no limited to use in sewer pipes, and that it may be used in water pipelines and high-pressure gas pipelines and equally obtain the same benefits and advantages.

The liner 10 is inserted into the sewer pipe 100 when the liner is in a somewhat flexible state, and is expanded against the interior surface 101 of the pipe and permitted to harden to form a new, permanent lining 12 within the existing pipe 100.

The liner 10 has a preselected length L and an initial original diameter D. The liner 10 includes a fabric sleeve 20 which is seamless for its entire length L. The fabric sleeve 20 has a knitted pile construction. It has been discovered that this knitted pile construction permits the liner 10 to expand radially outwardly to a significant degree. In testing of this knitted fabric sleeve 20, radial expansion of at least one-third greater than the original diameter of the sleeve 20 has been attained. It is believed that greater expansion may also be attained. It has also been discovered that the knitted pile construction further imparts a greater flexibility to the liner 10 than obtained with prior art constructions which permits it to be installed without fear of the fabric sleeve 20 wrinkling during installation which wrinkles may cause potential obstructions to desired flow of liquids within the finished relined section of the pipe 12.

The fabric sleeve 20 is formed from a knitted fabric in which synthetic multi-filament yarns are stitched together to form a knitted pile fabric. A suitable yarn may include a crimped polyester multi-filament yarn having a denier in the preferable range of from about 70 to about 300. The yarns are continuous rather than spun, and are knitted circularly on a continuous basis into a hollow tube 22 utilizing two different stitches. Some of the yarns are knitted into stitches which define a ground, or base fabric 24, of the fabric sleeve 20, while others of the yarns are knitted into stitches defining a plurality of terry loop piles 26 extending outwardly from the ground 24 for a preselected length. Lengths of from about 0.5 millimeters to about 4 millimeters have been found to give preferred results. The ground and pile stitches 24, 26 define open areas 28 in the fabric sleeve 20 of dimensions ranging from between about 1 micron to about 100 microns. Larger open areas are possible and may be implemented by utilizing yarns of different deniers. These open areas 28 are believed to be helpful in impregnating the fabric sleeve 20 with a resin 50 prior to installation of the liner 10 and further amplify the flexibility of the fabric sleeve 20 as compared to prior art liners. With these open areas 25, the resin may thoroughly impregnate the liner 10, thereby eliminating the need for a separate, heavy resin coating or multi-layer laminated resin coating which restricts the flexibility and expansion of the liner.

The extent of the open areas 28 may be regulated by controlling the thicknesses, or deniers of the adjoining ground and loop pile stitches 24, 26 such that a fabric sleeve which has a "tighter" stitching, i.e., one wherein the stitches are more closely spaced together, will have less expansion characteristics. The expansion of the fabric sleeve 20 may also be controlled by the selection of the material from which the yarn is spun. For example, the fabric sleeve 20 may be knitted from a Kevlar® yarn which does not stretch significantly so that the finished sleeve may have minor radial expansion characteristics as compared to a sleeve knitted from a polyester yarn, but significantly greater radial expansion characteristics as compared to a woven fabric tube, which has virtually no expansion characteristics.

The particular terry loop pile construction described above is merely exemplary of a knitted pile fabric. Other knitted pile constructions known in the art may be used to form the fabric sleeve 20. This knitted pile construction is exemplary of the construction of bag filters which are used in the filtration industry, such as the grain products industry in which filter bags are employed to collect particulate matter and separate same from air and gas streams, an example of such a knitted pile constructions being disclosed in U.S. Pat. No 4,322,232 issued Mar. 30, 1982.

The fabric sleeve 20 is saturated, or impregnated, with a liquid resin 50, such as an epoxy resin, polyester resin or vinylester resin which cures into a solid upon application of either heat, in instances, where the resin is a thermosetting resin or upon passage of time, in instances where the resin is a resin which cures at ambient temperatures. One epoxy resin which has been found to give desirable results in Aquata-poxy, manufactured by American Chemical Company of St. Louis, Mo. When the liner 10 is thoroughly impregnated, the resin 50 saturates all of the surfaces of the liner, including both the inner and outer surfaces 51, 52 of the fabric sleeve 20 as well as the interstitial areas defined by the ground and pile.

FIG. 3 illustrates a second seamless fabric sleeve 30 which may be used in conjunction with the knitted fabric sleeve 20 to provide reinforcement to the knitted sleeve 20 in order to enable the finished liner to withstand greater hydrostatic and earth pressure forces exerted upon the sewer pipe 100. The second fabric sleeve 30 is formed by braids 32 which are interlaced together in a radially circular fashion around the center of the second sleeve as shown. The braids 32 used in the second sleeve 30 typically are of a heavier weight and thickness than the yarns used in the first fabric sleeve 20. This difference imparts the second braided sleeve 30 with relatively greater strength characteristics as compared to the first knitted fabric sleeve 20 and thereby enhances the ability of a liner which uses a first and second sleeve composite construction to resist the hydrostatic and earth pressure loading which effects the existing underground pipe 100. The braiding defines interstitial areas 34 between the braids which may open under pressure and in response to stretching forces to permit passage of the resin therethrough so that the second sleeve 30 may be thoroughly saturated with resin.

The interlacing of the braids 32 in the second sleeve 30 permits the second sleeve to stretch in both the radial and longitudinal directions, with the greatest stretch occurring in the radial direction. This stretching characteristic is important in that it permits the second braided sleeve 30 to expand in unison with the first sleeve 20. Such a composite construction is shown in FIG. 4, which is a view illustrating a cured in place liner 40 with a portion of the liner cutaway to show the relationship between the two sleeves 20 and 30. In its installed state, the liner 40 includes a first fabric sleeve 20 of the knitted construction described above which forms an inner portion 42 of the liner 40 and which has been previously enveloped by a second braided sleeve 30 which forms the outer portion 44 of the liner 40. The second braided sleeve 30 is preferably braided over the first sleeve 20 during the assembly of the liner 40. The liner 40 is impregnated with a resin 50 which is forced through the open areas 28 of the first knitted sleeve 20 and the open areas between the braids 32 of the second braided sleeve 30.

FIGS. 5–5B illustrates another pipe liner 60 constructed in accordance with the principles of the present invention which is also of a composite construction. In this liner 60, multiple layers of the knitted fabric sleeve 20 are used to provide additional thickness to the finished liner 60. Similar to the liner 40 described above, the multiple layers of the liner 60 also expand in unison to prevent wrinkling and the formation of obstructions in the finished liner 60.

The liner 60 of FIG. 5 also includes an outer barrier, or resin shield 62 which is preferably formed from a urethane scrim 64. As illustrated in FIG. 5B, the urethane scrim 64 includes a polymeric flexible stratum, or base sheet 66 in which a scrim 68 is embedded therein, such as by molding. The scrim 68 consists of a loose fabric in which the intersecting stitches 70 are spaced relatively widely apart. Other polymers, such as polyurethane, may be used to provide the stratum 66 of the resin shield 62. The fabric scrim 68 provides reinforcement for the resin shield in two important aspects.

In the first aspect, when the resin shield 62 is used on the exterior of the liner 60, the scrim 68 permits the shield to expand without fear of rupturing the shield 62 along its length during expansion of the liner against the walls of the existing pipe. In the second instance, when the resin shield is positioned interior of the fabric sleeves which make up the liner 60, after the resin cures, the fabric scrim 68 provides reinforcement to the shield after the resin cures, so that the scrim may be more easily removed from the new cured-in-place pipe liner.

FIGS. 6–9 illustrate one process used for effecting a cured-in-place pipe repair utilizing the novel liners of the present invention. It can be seen that a subterranean pipe, such as a sewer pipe 100, has a compromised section 102 which is located a predetermined distance within the pipe 100 from a pipe accessway 104, such as a manhole 106. The length of the compromised section 102 and the distance of this section 102 from the accessway 104 is determined by a prior examination by way of a motorized closed-circuit television inspection apparatus (not shown) which may be inserted into the pipe and moved along the length of the pipe 100 to locate and measure compromised sections 102 of the pipe 100. Apart from determining the important parameters of the compromised section length and the distance from the accessway, the inspection apparatus is also useful in determining the extent of damage present in the compromised section 102.

A seamless fabric liner 10 of the construction as described above is selected and cut to a predetermined length which extends for at least the length of the compromised section 102. Depending on the severity of the damage which exists within the sewer pipe 100, the fabric liner may consist of a single fabric sleeve 20 (FIG. 1), a multiple fabric sleeve 60 (FIG. 5) or a composite sleeve construction 40 (FIG. 3) wherein the knitted fabric sleeve 20 forms an inner portion 42 of the liner 10 and a seamless braided fabric sleeve 30 forms an outer portion 44 of the liner 40.

Once the specific construction of the liner 10 is selected and cut to a specific length, a liquid resin 50 is applied to the liner 10 in a manner well known in the art, such that the resin 50 thoroughly impregnates the fabric sleeves which make up the liner 10. The open areas 28 between the stitches 24, 26 of the knitted fabric sleeve 20 permit the resin 50 to easily and readily pass through the sleeve 20 from one surface of the sleeve 20 to the other surface. Likewise, the braids 32 of the seamless braided sleeve 30 permit passage of the resin 50 through the sleeve 30. The resin 50 may be applied in a manner well known in the art. For example, the resin 50 may be applied to the liner be brushing or spraying, or the resin may be deposited on the liner and the liner subsequently passed through a wringer-device 108 having rollers which apply pressure to the liner 10 to force the resin 50 to completely impregnate the liner 10.

Figure 7:
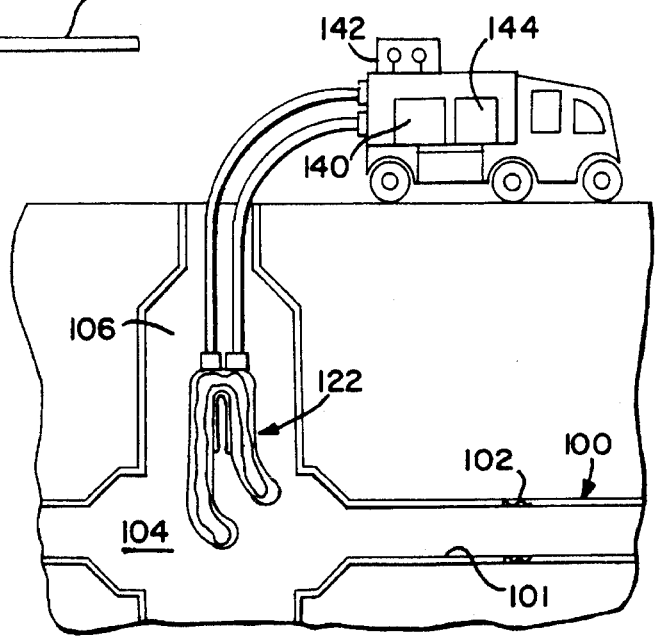
FIG. 7 is a view illustrating how the pipe liner is inserted into an underground pipeline.

Once the liner 10 has been impregnated with resin 50, it is positioned within the sewer pipe 100 in the area of the compromised pipe section 102 and subsequently expanded. In order to do so, as illustrated in FIG. 7, the resin-impregnated liner 114 is affixed to an expandable inflation member 110, such as a hollow rubber bladder 112, which is sealed at one end and has the ability to repeatedly expand and contract and to resist high temperatures. Preferably, the inflation member 110 is also fluid-tight. The resin-impregnated liner 114 may be passed through the center of the inflation member 110 to define a liner-bladder assembly 116 having an open end portion 118. The open end portion 118 has a free end, or lip 120, which extends past the end of the resin-impregnated liner 114. The liner 114 is then affixed to a carrying device 122 which is preferably used in the relining of sections of pipelines, rather than in the relining of a substantial length of pipeline as is the case of end to end repairs. The carrying device 122 is illustrated as a hollow, circular pipe 124 having a diameter $D_{122}$ which is less than the diameter $D_{100}$ of the existing pipe 100. A diameter of about 20% less than the existing sewer pipe 100 has been found to give preferred results when using a carrying device 122. The carrying device 122 has a length at least equal to the length of the liner-bladder assembly 116. The carrying device 122 functions as a removable shroud which encloses the resin-impregnated liner 114 to protect it from contacting the interior surface 101 of the existing pipe 100 and to prevent resin 50 from being scraped off of the liner 10 during insertion into the pipe 100.

The liner-bladder assembly 116, having been previously turned inside out such that the bladder 112 is on the outside of the liner 10, is placed into the carrying device 122, which preferably includes a hollow, flexible pipe section, illustrated as a corrugated plastic pipe 123. The open end lip portion 120 of the liner-bladder assembly is then attached to a circular collar portion 126 of the carrying device 122 in a manner such that the attachment is essentially fluid-tight. An effective means of attachment the liner-bladder assembly 116 is a circular pipe clamp 127, however, other suitable attachment means, such as a strong adhesive may also be used.

Once attached, the carrying device 122 and the liner-bladder assembly 116 are then inserted into the sewer pipe 100 and positioned such that the liner 10, when everted out of the carrying device 122, is positioned within the compromised pipe section 102. The carrying device 122 may be positioned in the pipeline by pulling it through the pipeline by a cable or rope which has been previously run through the pipeline. In order to inflate of the liner-bladder assembly 116 and to accelerate the curing of the resin 50, the carrying device 122 may be equipped with two hose connections, or ports 130, 132 in its rear end portion 128. These hose connections 130, 132 are adapted to engage two respective pressure hoses 134, 136. One of the hoses 134 serves as a supply conduit to supply a heated fluid to the inflation member 110 while the other hose 136 serves as a return conduit which returns the heated fluid from the bladder 112, back to an external heating source, such as a portable boiler 140.

Figure 8:
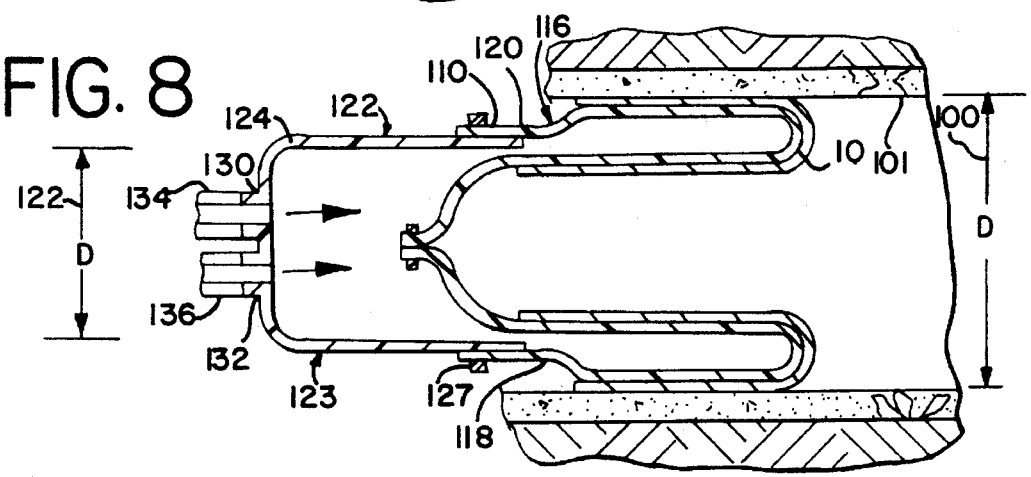
FIG. 8 is a view illustrating the everting of the pipe liner out of the carrying device, into the pipeline and expanding against the underground pipe.
Figure 9:
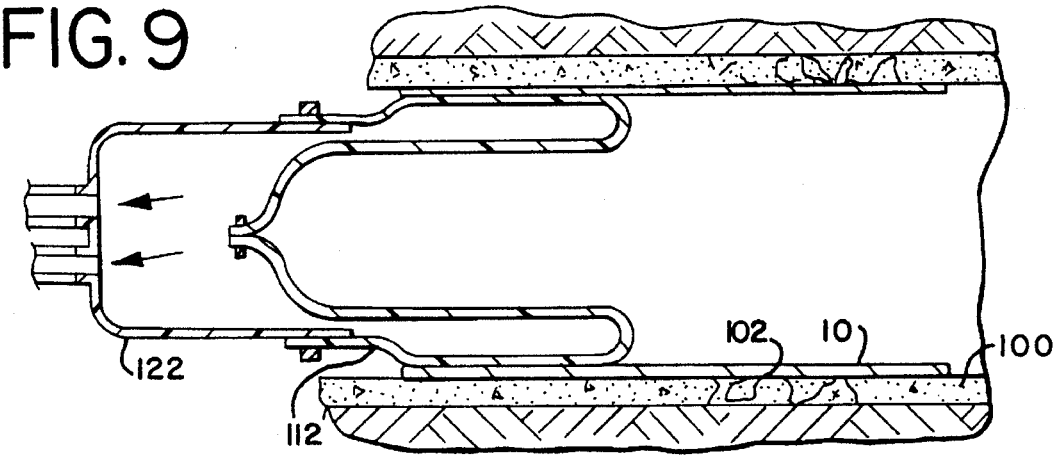
FIG. 9 is a view illustrating the withdrawal of the inflation member from the cured liner in place within the existing underground pipe.

FIG. 8 illustrates how the liner-bladder assembly 116 everts under the pressure of the hot water. A conventional means for monitoring the temperature and pressure of the hot water, such as a pressure and temperature gauge assembly 142, may be attached to the boiler 140. A pump or other circulator 144 is connected with the boiler and provides a means for circulating the heated fluid under pressure into the carrying device 122. The heated fluid which may be air or a liquid such as hot water, is pumped into the carrying device through the supply hose 134 and the pressure of the water causes the bladder 112 to evert out of the carrying device 122 in a manner such that the liner-bladder assembly 116 turns inside out as it leaves the carrying device 122 so that the resin-impregnated liner 114 opposes the interior surface 101 of the sewer pipe 100. As the pressure of the hot water increases, the liner-bladder assembly 116 expands within the sewer pipe 100 until the outermost fabric sleeve portion of the liner 10 is in contact with the interior surface 101 of the pipe 100.

Once the liner is fully expanded, the boiler 140 circulates hot water within the sewer pipe 100 by way of the circulator 144 to accelerate the curing of the resin 50. This process is especially effective in instances wherein the resin 50 is a thermosetting resin. When the resin has cured, the heated fluid is removed from the bladder by applying suction to the carrying device hose connections 130, 132. When completely drained, the bladder 112 is removed from the liner 10 by applying a vacuum to the supply and return hoses 134, 136. (FIG. 9) Because of the fluid-tight nature of the attachment between the bladder lip 120 and the carrying device collar 126, the vacuum pulls the bladder 112 away from the liner 10 and back into the carrying device 122. The carrying device 122 is then removed from the pipe 100 and the new pipe liner 10 is left in place in the compromised section 102, thereby effectively repairing the compromised pipe 102.

FIGS. 10–15 illustrate another method for installing a pipe liner 200 in accordance with the present invention which is particularly useful in effecting end to end repairs of an established pipeline 202. End to end refers to the pipeline length which extends between two established access points, such as manholes 204. As shown in FIG. 10, a fabric sleeve 206, seamless or otherwise, is laid out onto a flexible and expandable flat resin shield 208, preferably formed from a urethane scrim 210 as described above. The urethane scrim 210 is formed into a tubular membrane that extends the length of the fabric sleeve 206 as shown by welding the ends 212 together along the length of the sleeve 206. This welding may be accomplished by heat welding, solvent welding, ultrasonic welding or the like.

Once the resin shield 208 is formed into the tubular membrane, resin 215 is applied to a portion of the fabric sleeve 206 at an end 214 thereof which is closed off in a conventional manner, such as by way of a clamp 216. The resin 215 previously inserted into sleeve may be drawn along the length of the resin shield 208 to impregnate the fabric sleeve 206 by applying a vacuum to the interior of the resin shield 208. This is accomplished as depicted in FIGS. 11 & 12, wherein the resin shield 208 is periodically slit at preselected locations. A vacuum source 217 is inserted through the slit 218 and a vacuum is drawn to expeditiously pull the resin 215 along the length of the resin shield 208. After the resin 215 is drawn through each section of the sleeve 206, the slit 218 may be patched by adhering a small piece 220 of the urethane scrim to the resin shield 208 to seal the slit 218. Another slit 218 is made downstream of the first slit and the process repeated until the entire fabric sleeve is impregnated with the resin 215. When fully impregnated, the resin-impregnated sleeve and shield form a liner assembly 220 which is fully enveloped by the resin shield 208 and may subsequently be handled without fear of contaminating the resin 215. The resin shield 208 also permits the liner to be handled and installed in a "clean" manner such that the workers installing the liner will not be in contact with the resin.

The liner assembly 220 is then drawn through the pipe section in a manner known in the art such as by passing a cable 222 through the pipeline 202 and attaching one end of the cable 222 to an end of the liner assembly 220 and winching it through the pipe section. (FIG. 13.) In this manner of installation, the resin-impregnated sleeve 206 is completely enveloped by the resin shield 208, so that groundwater in the compromised pipe section will not wash off the resin and further, the resin will not become contaminated by the portions of the pipe section during installation so that the risk, if any, of resin contamination, is substantially eliminated by the resin shield.

After the liner assembly 220 is positioned in the pipe, it may be inflated either by way of an inflation bladder as described above or, by pumping air into the center of the liner assembly 220. Because the resin shield 208 is a complete barrier to air and liquids, the fabric sleeve 206 and the shield 208 both expand radially outwardly against the interior pipe surface 203 until the resin cures to form a new pipe lining 200. The liner may also be inflated by everting an inflation bladder formed from the scrim material down the center of the liner assembly 220 as described previously. When the resin-impregnated fabric sleeve is cured, the inner urethane scrim which serves as the inflation bladder may be easily removed from the new cured-in-place pipe lining. The scrim embedded in the inflation bladder assists in maintaining the integrity of the resin shield when it is withdrawn from the new cured liner so that it does not tear or leave remnants of the shield in the liner.

The resin shield provides significant benefits when combined with a fabric sleeve. As shown in FIGS. 13 & 14, when the resin shield 208 is used as a barrier material for the installed lining, it keeps resin from washing out of the fabric sleeve due to contact with groundwater flowing near or at the compromised sections of the pipe. It also acts as a gasket between the cured in place liner and the underground pipe which will prevent tracking. It further prevents contamination of the resin during introductions of the resin-impregnated liner into the pipe. It still further acts as barrier to prevent the occurrence of resin slugs from entering and shutting off service laterals to customers as illustrated in FIG. 15 where it can be seen that the resin shield 208 prevents any resin 215 from the sleeve 206 from entering the service lateral connection 230. It also substantially prevents the migration of resin during introduction of the liner assembly into the pipe due to contact with the inner walls of the pipe. Lastly, it also acts a vapor barrier to fumes emanating from the resin during curing to prevent such fumes from entering customer households through service connections during relining.

It will be appreciated that the embodiments of the present invention which have been discussed are merely illustrative of some of the applications of this invention and that numerous modifications may be made by those skilled in the art without departing from the true spirit and scope of this invention.

I claim:

1. A method of lining the interior of a pipeline, comprising: providing a liner having a preselected length and a preselected original diameter, the liner being formed from a first tubular, seamless knitted fabric sleeve which is circularly knit and including stitches defining both a ground and terry loop pile extending from the ground for a preselected length, said ground and terry loop pile stitches permitting said fabric sleeve to expand radially outwardly to a final diameter which is greater than said liner original diameter when pressure is applied to an interior surface of said liner; impregnating said liner with a synthetic resin to form a resin-impregnated sleeve assembly; introducing said resin-impregnated sleeve assembly into the pipeline and extending said resin-impregnated sleeve assembly through a preselected length of said pipeline; expanding said resin-impregnated sleeve assembly radially outwardly along said liner preselected length until an outer circumferential surface of said resin-impregnated sleeve assembly contacts the interior surface of said pipeline; and, allowing said resin to cure, whereby said resin-impregnated sleeve assembly forms a new interior lining within said pipeline.

2. A method according to claim 1, further including attaching an inflation means to said resin-impregnated sleeve assembly prior to insertion of said resin-impregnated sleeve assembly into said pipeline, said inflation means including an inflatable member which expands against said resin-impregnated sleeve assembly in response to fluid pressure applied to said inflation means.

3. A method according to claim 1, wherein said inflation means is formed from a flexible polymeric material having a scrim embedded therein.

4. A method according to claim 2, wherein said resin is a thermosetting polyester resin.

5. A method according to claim 2, wherein said resin is an ambient temperature curing epoxy resin.

6. A method according to claim 2, further including expanding said resin-impregnated-sleeve assembly by introducing a heated fluid under pressure into said inflation means until the heated fluid reaches a predetermined pressure at which pressure said resin-impregnated-sleeve assembly contacts with said pipeline interior surface; maintaining said fluid pressure for a preselected amount of time in order to cure said resin; releasing said predetermined pressure; and removing said inflation means from said liner and said pipeline.

7. A method according to claim 1, further including applying a second seamless tubular, knitted fabric sleeve to said first knitted fabric sleeve, the second knitted fabric sleeve having a knitted construction similar to said first fabric sleeve and sharing the same expansion characteristics of said first fabric.

8. A method according to claim 1, further including applying a second fabric sleeve to said first knitted fabric sleeve, the second fabric sleeve including a seamless, braided fabric sleeve which is formed from braids which are larger than the stitches of said first fabric sleeve, said second fabric sleeve serving to reinforce said first fabric sleeve.

9. A method according to claim 1, further including enveloping said resin-impregnated liner with a flexible, expandable polymeric tubular membrane reinforced by a scrim embedded therein.

10. A pipe lined with a lining material, comprising: a pipe having an interior surface; a seamless lining material having respective opposing inner and outer surfaces, the lining material including a seamless, knitted fabric sleeve circularly knitted along a length of said lining material, the fabric sleeve having a plurality of stitches defining a ground portion and a plurality of stitches defining a terry loop pile extending through and away from said ground for a predetermined length, the ground portion stitches defining open areas within said fabric sleeve, said ground portion and terry loop pile permitting said fabric sleeve to expand radially outwardly when pressure is applied to an interior surface of said fabric sleeve; a coating of synthetic resin impregnating said fabric sleeve by passing through said open areas, said lining material being installed in said pipe by inserting said resin-coated lining material into said pipe and expanding said lining material such that an outer surface of said lining material contacts said pipe interior surface.

11. The pipe of claim 10, further including a second fabric sleeve formed from a seamless, braided fabric tube and disposed over said fabric sleeve such that the fabric tube forms said lining material outer surface and contacts said pipe interior surface.

12. The pipe of claim 10, wherein said lining material is installed in said pipe by everting said lining material through said pipe.

13. The pipe of claim 11, wherein said lining material is installed in said pipe by turning said lining material inside out such that second fabric sleeve initially forms said inner surface of said lining material and after expansion said through said pipe.

14. The pipe of claim 10, wherein said lining material includes a fabric-reinforced, polymeric outer shield disposed between said fabric sleeve and said pipe interior surface extending for the length of said fabric sleeve.

15. The pipe of claim 14, wherein said outer shield includes a urethane scrim.

16. The pipe of claim 10, wherein said lining material is installed in said pipe by enveloping it with a flexible fabric-reinforced outer shield.

17. A liner for use in a pipe comprising: a first seamless, knitted fabric sleeve having an original diameter, the first fabric sleeve formed by circularly knitting multi-filament yarn to define stitches forming a ground and stitches forming a terry loop pile extending away from the ground, the ground stitches further defining open areas therebetween said ground and terry loop pile stitches permitting said knitted fabric sleeve to expand radially outwardly when pressure is applied to an interior surface of said liner; a second seamless, braided fabric sleeve surrounding and in contact with said first sleeve for a length of said liner, said first and second sleeves having similar radial expansion characteristics, whereby said liner may be expanded up to an installation diameter which is greater than the original diameter of said first fabric sleeve; and said first and second fabric sleeves being impregnated with a resin, which when cured in place within a pipeline, forms a permanent new lining for the pipeline.

18. The pipe liner of claim 17, wherein said terry loop piles extend from said ground for a length of about 0.5 millimeters to about 4 millimeters and said open areas are between about 1 micron and 100 microns.

19. The pipe liner of claim 17, wherein said resin includes a thermosetting epoxy resin.

20. The pipe liner of claim 17, wherein said resin includes a polyester resin.

21. The pipe liner of claim 18, wherein said multi-filament yarn of said first fabric sleeve has a denier from about 70 to about 300.

22. The pipe liner of claim 17, further including a flexible, fabric-reinforced polymeric separate tubular membrane having which forms a barrier between said fabric sleeves and said pipeline to prevent migration of resin out of said resin-impregnated fabric sleeves when said resin-impregnated fabric sleeves are cured in place within a pipeline.

23. A method for lining the interior of a pipeline, comprising: providing a fabric liner of a preselected length and preselected diameter, impregnating the fabric liner for its entire length with a liquid curable resin which solidifies upon curing, enveloping said fabric liner with a flexible, polymer-based fabric-reinforced outer shield in the form of a scrim so as to form a tubular membrane on the outer surface of said liner extending for the length of the liner, inserting the enveloped, resin-impregnated liner into the pipe, expanding the resin-impregnated liner against an interior surface of said pipe and permitting said resin-impregnated liner to cure so as to form a new pipe lining within the existing pipe.

24. The method according to claim 23, wherein said fabric liner includes a knitted, seamless fabric sleeve.

25. The method according to claim 23, wherein said fabric liner includes an inner knitted, seamless fabric sleeve and an outer braided, seamless fabric sleeve.

26. The method according to claim 23, wherein said shield is formed from a urethane fabric scrim.

* * * * *

UNITED STATES PATENT AND TRADEMARK OFFICE
CERTIFICATE OF CORRECTION

PATENT NO. : 5,501,248
DATED : March 26, 1996
INVENTOR(S) : Larry W. Kiest, Jr.

It is certified that error appears in the above-indentified patent and that said Letters Patent is hereby corrected as shown below:

Col. 1, line 63 "add" should read --and.

Col. 2, line 36 "is" should be deleted.

Col. 3, line 45 "is" should be deleted.

Col. 5, line 61 "for" should be --from--;
"detail" should be --detailed--.

Claim 13 at Col. 14, line 12 "said" (second occurrence) should be deleted.

Signed and Sealed this

Twenty-fifth Day of June, 1996

Attest:

BRUCE LEHMAN

*Attesting Officer*           *Commissioner of Patents and Trademarks*